US007152718B2

(12) United States Patent
Doornbos et al.

(10) Patent No.: US 7,152,718 B2
(45) Date of Patent: Dec. 26, 2006

(54) DAMPER

(75) Inventors: David A. Doornbos, Manteno, IL (US); Steven L. Bivens, Kankakee, IL (US)

(73) Assignee: Illinois Tool Works Inc, Glenview, IL (US)

( * ) Notice: Subject to any disclaimer, the term of this patent is extended or adjusted under 35 U.S.C. 154(b) by 44 days.

(21) Appl. No.: 10/316,278

(22) Filed: Dec. 11, 2002

(65) Prior Publication Data

US 2003/0192750 A1 Oct. 16, 2003

Related U.S. Application Data

(60) Provisional application No. 60/373,041, filed on Apr. 16, 2002.

(51) Int. Cl.
*F16D 57/02* (2006.01)

(52) U.S. Cl. ........................ 188/294; 188/82.2; 188/64

(58) Field of Classification Search ............... 188/82.1, 188/82.2, 82.5, 64, 130, 290–294; 464/57; 74/573 R; 16/64, 63, 231, 50, 85, 82, 68–70, 16/87, 354, 54, DIG. 10; 185/37, 39; 192/45; 242/375, 396, 375.1, 381, 381.5; 49/352
See application file for complete search history.

(56) References Cited

U.S. PATENT DOCUMENTS

| | | | | |
|---|---|---|---|---|
| 4,576,252 | A | 3/1986 | Omata | 185/39 |
| 4,688,695 | A | 8/1987 | Hirohata | 220/336 |
| 4,872,239 | A * | 10/1989 | Ferguson et al. | 16/64 |
| 5,809,697 | A | 9/1998 | Chen | 49/386 |
| 6,062,623 | A | 5/2000 | Lemmen | 296/37.8 |
| 6,086,007 | A * | 7/2000 | Till | 242/381 |
| 6,185,868 | B1 | 2/2001 | Kato | 49/339 |
| 6,368,259 | B1 | 4/2002 | Liao et al. | 482/132 |
| 6,467,713 | B1 * | 10/2002 | Watanabe et al. | 242/375.1 |
| 6,523,788 | B1 | 2/2003 | Zander | 246/111 |
| 6,749,242 | B1 | 6/2004 | Park | 296/37.12 |
| 2003/0080131 | A1 | 5/2003 | Fukuo | 220/264 |
| 2003/0192750 | A1 * | 10/2003 | Doornbos et al. | 188/82.1 |
| 2004/0189035 | A1 | 9/2004 | Kurachi et al. | 296/37.12 |

FOREIGN PATENT DOCUMENTS

| | | | |
|---|---|---|---|
| CA | 2425399 | * | 10/2003 |
| DE | 100 07 406 | A1 | 8/2001 |
| EP | 0 562 284 | A1 | 9/1993 |
| EP | 0 894 932 | A2 | 2/1999 |
| EP | 001355029 | A2 * | 10/2003 |
| JP | 9-317317 | | 12/1997 |
| JP | 11-2064 | * | 1/1999 |
| JP | 11002064 | | 1/1999 |
| JP | 2000130004 | * | 5/2000 |

* cited by examiner

OTHER PUBLICATIONS

English Translation of Tanaka et al (JP 11-2064).*

*Primary Examiner*—Devon Kramer
(74) *Attorney, Agent, or Firm*—Mark W. Croll; Paul F. Donovan

(57) ABSTRACT

A damper includes a frame, a main gear mounted to the frame for rotation about an axis of rotation, and a spring operably connecting the main gear and the frame such that rotation of the main gear tensions the spring. The main gear has a circumferential recess formed therein that defines a circumferential channel or reel. An elongated flexible member is wrapped around the main gear, disposed within the circumferential channel. A gear damper is mounted to the frame and is operably engaged with the main gear to dampen rotational movement of the main gear. The damper can be configured for one-way and two-way damping.

15 Claims, 4 Drawing Sheets

DAMPER

CROSS-REFERENCE TO RELATED APPLICATION DATA

The present application claims priority of U.S. Provisional Application Ser. No. 60/373,041, filed Apr. 16, 2002.

BACKGROUND OF THE INVENTION

The present invention pertains to dampers. More particularly, the present invention pertains to one-way and two-way dampers that use a strand-type tether strap to control movement of an object.

Movement dampers are used in various assemblies to control the movement of assembly components. For example, damper devices can be used to control the movement of spring actuated drawers, doors and other components. Dampers can provide a more controlled, gentle and smooth operation, than would otherwise occur from the movement caused by release of the spring energy.

It is known to use control arms to limit movement of a component such as the door of an automobile glove box, the cover for a center console of an automobile or the like. Such devices also have application in and utility for furniture drawers and doors. Typically, damper devices are linear in design, with an opening stroke directly related to the length of the control arm. Such dampers are not readily adaptable to installations requiring different operating stroke lengths. As such, if a longer or shorter stroke is desired, a new arm must be designed. This requires that new molds be prepared and new components manufactured for the specific application. Known designs also are bulky, requiring significant space in which to operate.

String-type tethers are also known. However, these tether devices require the use of expensive materials that do not stretch in length from use. One known material is a KEVLAR® string. KEVLAR is a registered trademark of Du Pont and pertains to synthetic resins or plastic materials for general industrial applications. If the string were to stretch, operation of the device could be adversely affected. Known string-type devices also exhibit "jump" during movement, which is an undesirable characteristic when the smooth, progressive movement of an object is desired.

Known dampers are of the two-way in that they dampen movement in both directions. Conversely, one-way dampers dampen movement in only one direction. Typically, one-way dampers are not readily adaptable to two-way damping operation, and two-way dampers are not readily adaptable to damping operation in only one direction.

As a result of the limitations in the design of previous dampers, it has been necessary to design, manufacture and stock a variety of different damper embodiments for different operational stroke lengths, and for use in applications that require either one-way and two-way damping operations.

Accordingly, there exists a need for a damper that can be readily adapted for use in both one-way and two-way damping operation. Desirably, such a damper can be readily adjusted for damping operation along different stroke lengths. More desirably, such a damper uses a reduced number of specific parts for damper operation in the one-way or two-way damper designs.

BRIEF SUMMARY OF THE INVENTION

A damper can be readily adapted for use in both one-way and two-way damping operation. Desirably, such a damper can be readily adjusted for damping operation along different stroke lengths. The damper includes a frame and a main gear mounted to the frame for rotation about an axis of rotation. In one embodiment, the gear has a circumferential recess formed therein that defines a circumferential channel.

A spring operably connects the main gear and the frame such that rotation of the main gear tensions the spring. An elongated flexible member, such as a string or tether is wrapped around the main gear and is disposed within the circumferential channel. A gear damper is mounted to the frame and is operably engaged with the main gear to dampen rotational movement of the main gear. The gear damper also has an axis of rotation.

The damper can be configured for one-way damping in which main gear rotation is dampened in one rotational direction and is permitted free rotational movement in an opposite rotational direction. The damper can also be configured for two-way damping in which rotational movement of the main gear is dampened in two (or both) directions of rotational movement.

In both configurations, the gear damper maintains operable engagement (e.g., is enmeshed) with the main gear when the main gear rotates in either direction. The gear damper can be is mounted to the housing to maintain its axis of rotation fixed relative to the axis of rotation of the main gear. This is preferably the configuration for two-way damping. Alternately and for one-way damping, the gear damper is mounted to the frame to permit movement of the gear damper axis of rotation relative to the main gear axis of rotation.

For one-way damping, the gear damper can be disposed in a non-circular opening in the frame. When in a first position within the opening, the gear damper dampens rotational movement of the main gear. When in a second position within the opening, the gear damper permits free rotational movement of the main gear.

In a present one-way configuration, movement of the gear damper is achieved by mounting the gear damper to a housing that is disposed within the frame opening. In such an arrangement, in the first position the housing is fixedly disposed within the opening to resist rotational movement of the housing. In the second position, the housing is disposed in the opening to permit rotational movement thereof.

Movement and free rotation of the housing can be carried out by one or more teeth on the housing and on the frame that engage one another to secure the housing in the opening or to disengage from one another to permit free rotation within the housing.

The main gear can be mounted to the frame by mounting to a post that extends outwardly from the frame. In this configuration, a first end of the spring can be secured to the frame at the post, and a second end of the spring can be mounted to the main gear. The main gear can be mounted and secured to the post by outwardly extending locking elements extending from the post.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
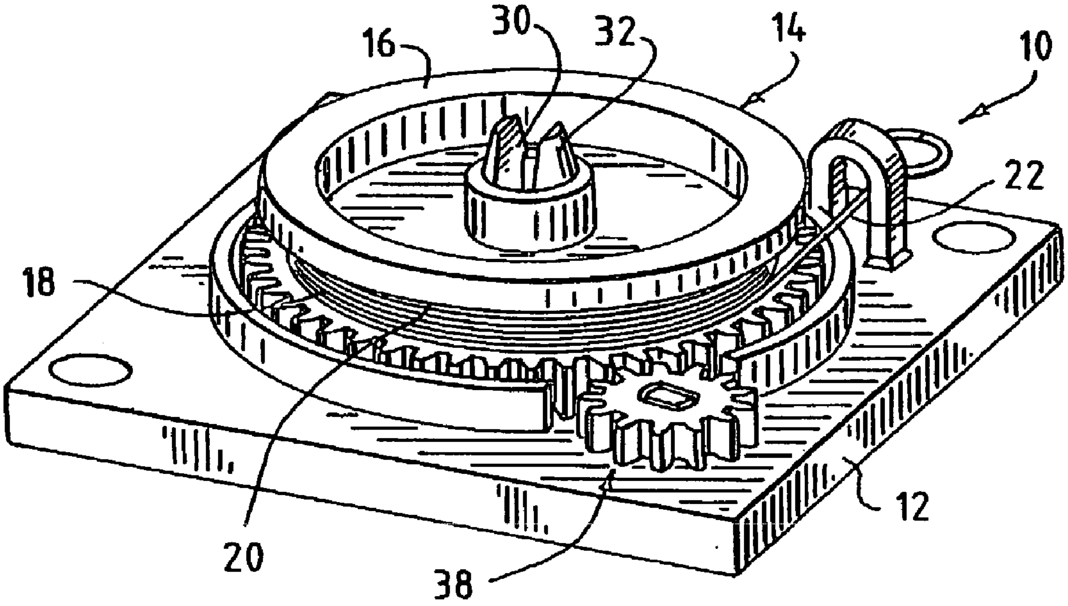
FIG. 1 is a perspective view of an embodiment of a strand damper in accordance with the principles of the present invention.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

Referring now to the figures and in particular, to FIG. 1, there is shown a strand damper 10 embodying the principles of the present invention. The damper 10 includes a frame 12 and a gear assembly 14 having a main gear 16 and a reel or pulley 18 associated with the main gear 16. The reel 18 is defined by a circumferential recess or channel 20 formed in the gear 16. The gear assembly 14 is mounted to or installed on the frame 12. A tether or flexible element 22, in the nature of a strand or string is attached to the reel 18. The tether 22 wraps around, and unwraps from, the reel 18.

A biasing element 24, such as the exemplary coil spring, cooperates with the main gear 16. The spring 24 is inserted into the back of the gear 16, with a first, outside end 26 of the spring 24 attached to the main gear 16, preferably near a perimeter 28 of the gear 16. The gear assembly 14 with the spring 24 attached to the main gear 16 is pressed over a center post 30 in the frame 12, such that the gear assembly 16 is rotatable on the center post 30. The post 30 includes outwardly extending locks or detents 32 to secure the gear assembly 14 to the post 30. The center of the coil spring, at a second end 34, is keyed into a slot 36 in the base of the frame 12 or the post 30. In this configuration, the second end or center 34 of the spring 24 is "locked" to the frame 12.

The damper 10 further includes a gear damper 38 having a shaft 40 with a gear 42 mounted thereto. The gear damper 38 is positioned for engagement with the main gear 16. The gear damper 38, which provides a braking or resistance force, is mounted to a housing 44 that, in one embodiment, can include a toothed or ribbed portion 146 (see FIG. 3). The gear damper housing 44 supports the gear damper gear 42.

The gear teeth 48 of the gear damper 38 mesh with the teeth 50 of the main gear 16 when the gear damper 38 is assembled onto the frame 12. The elongated flexible member 22, such as the illustrated string or tether is wrapped around the reel portion 18 on the gear assembly 14, with one end of the string 22 attached to the reel 18. An opposing end of the string 22 is attached to the device (not shown), the movement of which is to be controlled (e.g., a door or the like). A string guide 52 is mounted to the frame 12, through which the string 22 traverses, to maintain the relative position of the string 22 on the damper 10. The guide 52 can be configured (e.g., sized) such that a fitting 54 (such as the illustrated hoop) on the end of the string 22 cannot pass through the guide 52.

Figure 2:
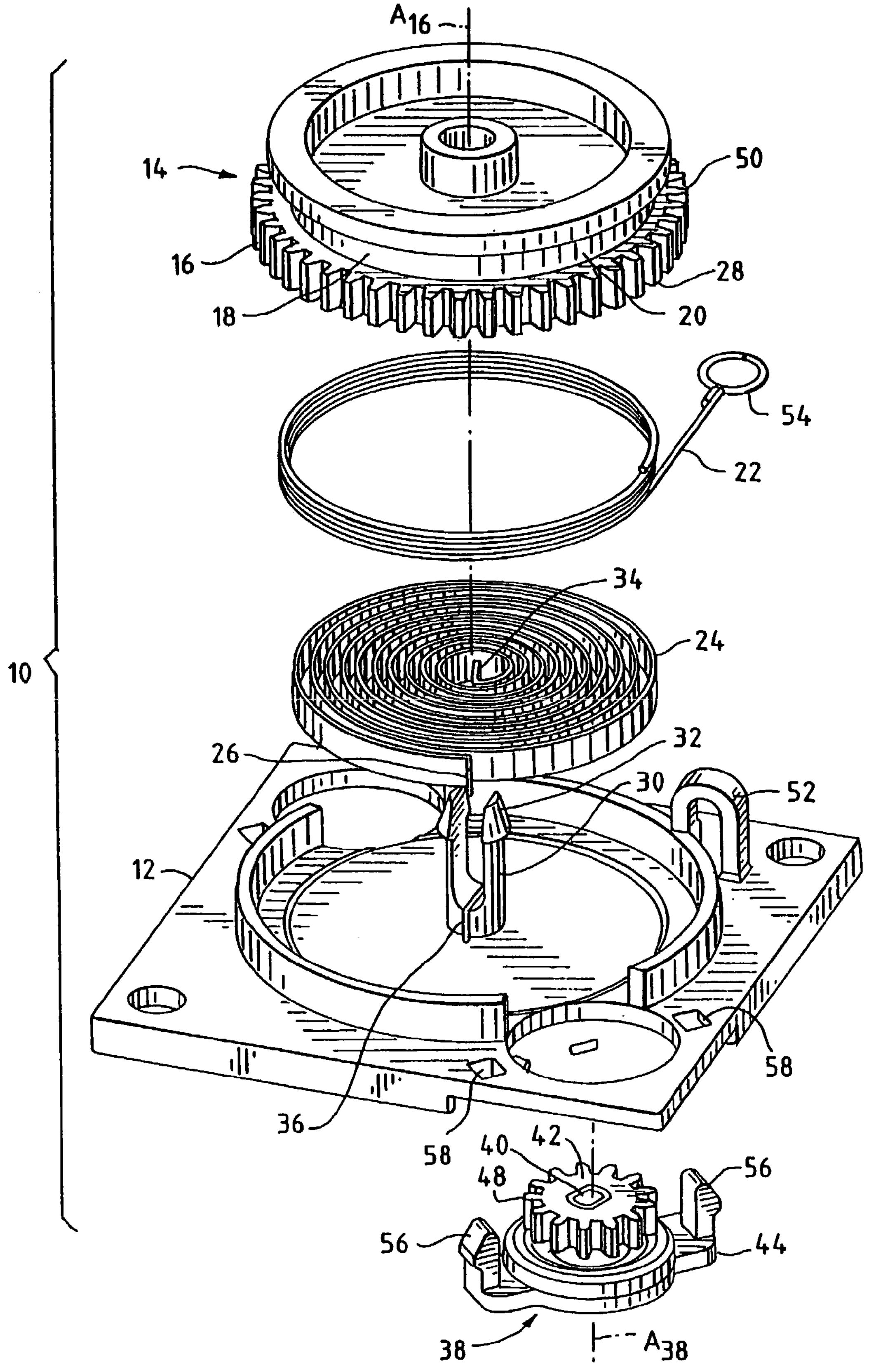
FIG. 2 is an exploded view of a strand damper that is adapted for two-way damping operation.

As seen in FIG. 2, the damper 10 can be configured for two-way operation to dampen movement when the string 22 is pulled from the reel 18, and when the spring 24 rotates the reel 18 to recoil the spring 24 and rewind the string 22. In such a configuration, the gear damper housing 44 is secured to the frame 12 in a stationary manner. That is, the rotational axis $A_{38}$ of the gear damper 38 remains stationary relative to the rotational axis $A_{16}$ of the main gear 16. To this end, the gear damper 38 can be mounted to the frame 12 by, for example, tabs 56 that are received and secured in openings or slots 58 in the frame 12. In this manner, the gear damper gear 42 is positioned to remain engaged with the main gear 16 of the gear assembly 14 regardless of the direction of rotation of the main gear 16.

Figure 3:
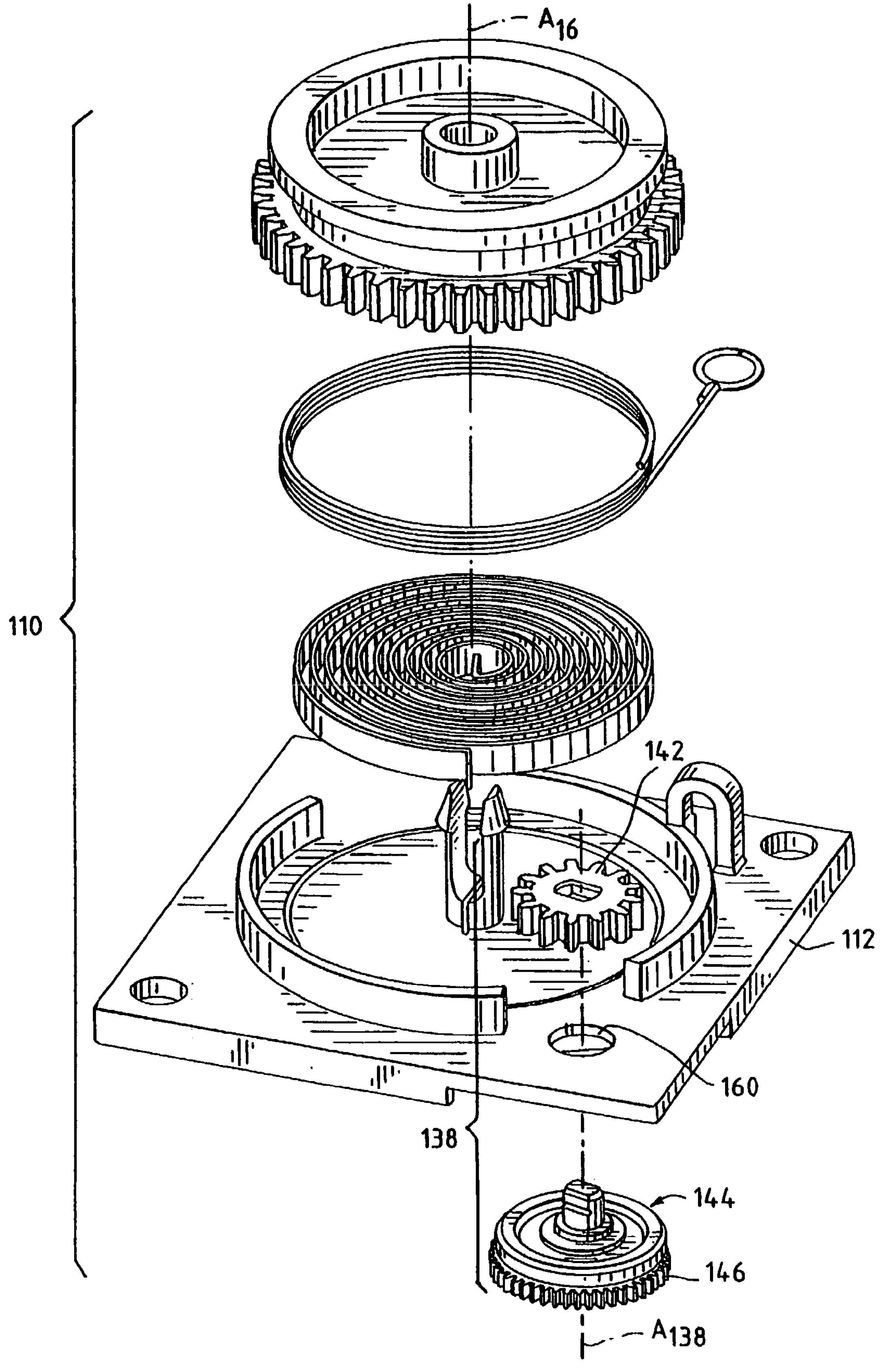
FIG. 3 is an exploded view of a strand damper that is adapted for one-way damping operation.
Figure 4:
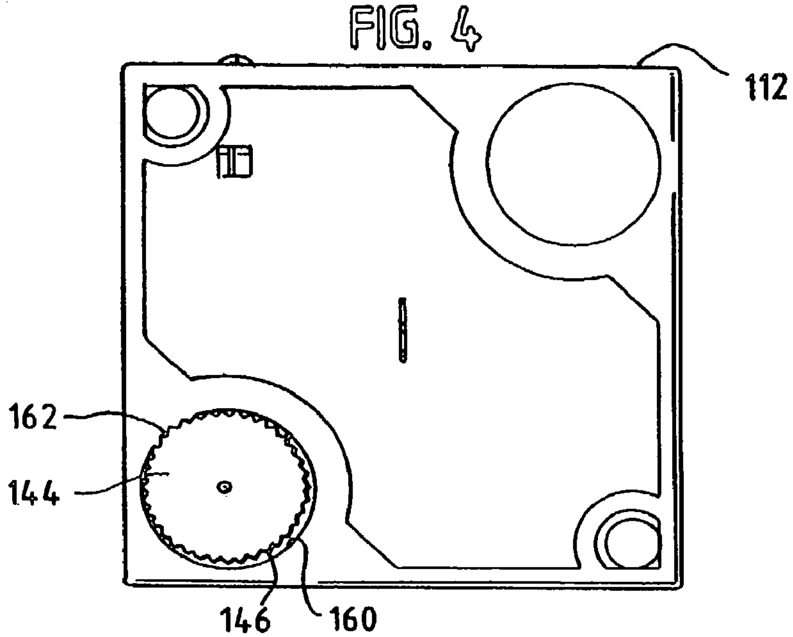
FIG. 4 is a bottom plan view of the strand damper of FIG. 3, illustrating the damper in condition for damping control movement.
Figure 5:
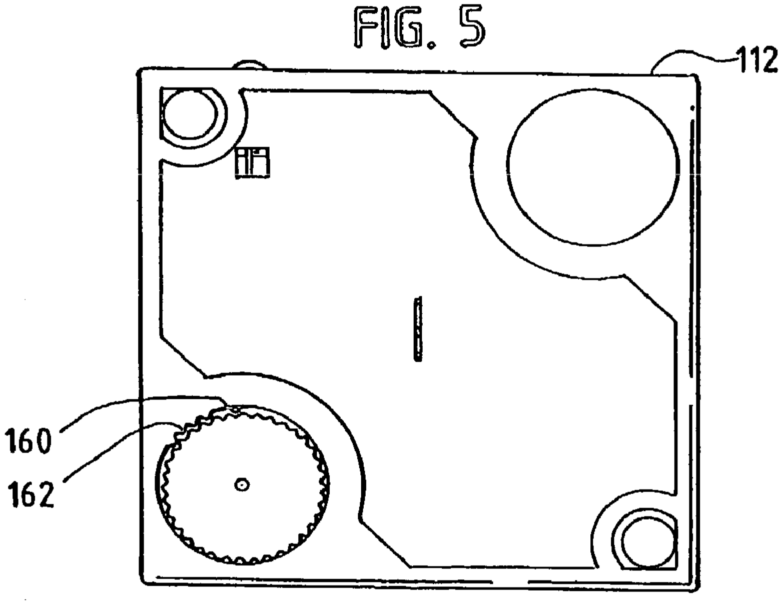
FIG. 5 is a bottom plan view similar to FIG. 4, illustrating the damper in a free-wheeling, non-damping condition.
Figure 6:
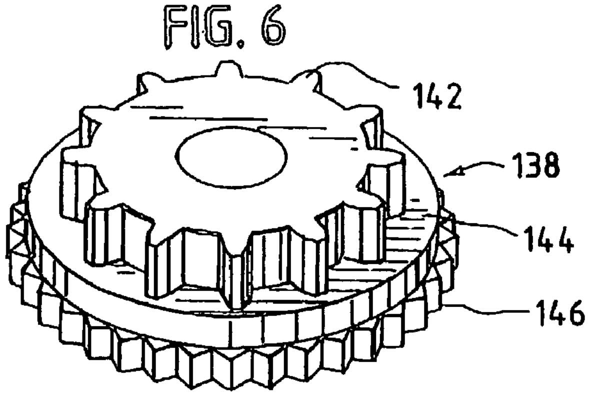
FIG. 6 is a perspective view of the gear damper.

Alternately, as seen in FIGS. 3–5, the damper 110 can be configured for one-way operation in which movement is dampened either when the string 22 is pulled from the reel 18 or when the spring 24 rotates the reel 18 (recoiling the spring 24) to rewind the string 22, but is not dampened in both directions. In such a configuration, the gear damper 138 is disposed to move relative to the main gear 16. Preferably, however, even though the gear damper 138 moves relative to the main gear 16, the gear damper 138 remains in meshed engagement with the main gear 16.

In one one-way configuration, the gear damper housing 144 is disposed in an elliptical slot 160 in the frame 112. A portion of the slot 160 has a cog or cogs 162 (e.g., a tooth or teeth) for engaging or mating with teeth or ribs 146 on the gear damper housing 144. Movement of the string 22 in one direction (the damping direction) causes the gear damper 138 to move in the elliptical slot 160 towards the slot cogs 162 (see FIG. 4). This causes the housing teeth 146 to engage the slot cogs 162 to secure the gear damper housing 144 in position. This prevents the housing 144 from rotating. However, because the main gear 16 and gear damper 138 are meshed, the gear damper gear 142 will then rotate. In that rotation of the gear damper gear 142 is resistive, this effects damping of the rotation of the main gear 16 to provide damping control.

Conversely, movement of the string 22 in an opposite direction causes the gear damper housing 144 to move in the elliptical slot 160 away from the slot cogs 162 (see FIG. 5). In this condition, the gear damper housing 144 is no longer fixed in position, and is freely rotatable within the slot 160. With the housing 144 not secured, as the main gear 16 rotates (even though the gear damper gear 142 rotates with the main gear 16 to which it is engaged), the entire housing 144 rotates, eliminating damping action of the gear damper 138.

In a typical installation, the frame 12, 112 can be attached to any surface or device by various means, including snaps, screws, adhesive or the like. For example, one application of the present damper 10, 110 is for use on glove box doors of automobiles, in which the frame 12, 112 is attached to the stationary frame of the glove box. The free end of the tether or string 22 is attached to a moveable portion, for example, the glove box door.

As the glove box door is opened, the string 22 is pulled outwardly, thus causing the main gear 16 to rotate. Rotation of the main gear 16 causes the spring 24 to wind tighter. The combination of the damper 10, 110 and the spring 24 resistance creates a damped opening movement of the glove box door. When it is desired to close the glove box door, the spring 24 turns the gear 16 in the opposite direction which rewinds the string 22 on the reel portion 18 of the gear assembly 14. In addition to rewinding the string 22, the spring 24 force also assists door closure. In this arrangement, the spring 24 is preferably pre-loaded so that the spring 24 is tight when the glove box is closed.

Many of the components of the present string damper 10, 110 can be used in both the one-way and two-way damping designs. In this manner, only a limited number of specific components are required to either secure the gear damper 38 to the housing permanently (two-way operation), or to provide the gear damper 138 in an elliptical slot 160 in the frame 112 (one-way operation). Advantageously, the present string damper 10, 110 is compact, requiring minimal space for installation and operation.

All patents referred to herein, are hereby incorporated herein by reference, whether or not specifically do so within the text of this disclosure.

In the present disclosure, the words “a” or “an” are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A damper, comprising:

a frame having a first side and an opposite second side;

a main gear mounted to the first side of the frame for rotation, the gear having a circumferential recess formed thereon defining a circumferential channel, the gear having an axis of rotation;

a spring operably connecting the main gear and the frame such that rotation of the main gear tensions the spring;

an elongated flexible member wrapped around the main gear and disposed within the circumferential channel, wherein one end of the elongated flexible member is attached to the main gear and an opposite end is configured for attachment to a device that is adapted for movement, the movement of which is controlled by the damper; and a gear damper having a gear and a housing to support the gear, the gear damper being mounted to the frame such that the housing is positioned on the second side of the frame and the gear is positioned on the first side of the frame so as to be operably engaged with the main gear to dampen rotational movement of the main gear, the gear damper having an axis of rotation that is different and spaced away from the axis of rotation of the main gear, wherein the gear damper is operably engaged with the main gear to dampen rotational movement of the main gear in two directions of rotational movement of the main gear.

2. The damper in accordance with claim 1 wherein the gear damper is mounted to the frame to maintain its axis of rotation fixed relative to the axis of rotation of the main gear.

3. The damper in accordance with claim 2 wherein the gear damper is removably mounted to the frame.

4. A damper, comprising:

a frame having a first side and an opposite second side;

a main gear mounted to the first side of the frame for rotation, the gear having a circumferential recess formed thereon defining a circumferential channel, the gear having a axis of rotation;

a spring operably connecting the main gear and the frame such that rotation of the main gear tensions the spring;

an elongated flexible member wrapped around the main gear and disposed within the circumferential channel, wherein one end of the elongated flexible member is attached to the main gear and an opposite end is configured for attachment to a device that is adapted for movement, the movement of which is controlled by the damper; and a gear damper having a gear and a housing to support the gear, the gear damper being mounted to the frame such that the housing is positioned on the second side of the frame and the gear is positioned on the first side of the frame so as to be operably engaged with the main gear to dampen rotational movement of the main gear, the gear damper having an axis of rotation that is different and spaced away from the axis of rotation of the main gear, wherein the gear damper is operably engaged with the main gear to dampen rotational movement of the main gear in one direction of rotation and to permit free rotational movement of the main gear in an opposite direction of rotational movement, and wherein the gear damper is mounted to the frame to permit movement of the gear damper axis of rotation relative to the main gear axis of rotation, such that movement of the gear damper axis is caused by movement of the elongated flexible member.

5. The damper in accordance with claim 4 wherein the gear damper maintains operable engagement with the main gear when the main gear rotates in either direction of rotational movement.

6. The damper in accordance with claim 5 wherein the main gear axis of rotation is fixed relative to a housing to which the gear damper is mounted.

7. The damper in accordance with claim 4 wherein the gear damper is disposed in a non-circular opening in the frame and wherein when in a first position within the opening the gear damper dampens rotational movement of the main gear and when in a second position within the opening the gear damper permits free rotational movement of the main gear.

8. The damper in accordance with claim 7 wherein the gear damper is mounted to a housing, the housing being disposed within the frame opening and wherein in the first position the housing is fixedly disposed within the opening to resist rotational movement of the housing and wherein in the second position the housing is disposed in the opening to permit rotational movement thereof.

9. The damper in accordance with claim 8 wherein the frame includes one or more teeth and the housing includes one or more teeth, and wherein when in the first position, the housing one or more teeth engage the frame one or more teeth to secure the housing in the opening.

10. A damper, comprising:

a frame having a first side and an opposite second side;

a main gear mounted to the first side of the frame for rotation, the gear having a circumferential recess formed thereon defining a circumferential channel, the gear having an axis of rotation;

a spring operably connecting the main gear and the frame such that rotation of the main gear tensions the spring;

an elongated flexible member wrapped around the main gear and disposed within the circumferential channel, wherein one end of the elongated flexible member is attached to the main gear and an opposite end is configured for attachment to a device that is adapted for movement, the movement of which is controlled by the damper; and a gear damper having a gear and a housing to support the gear, the gear damper being snap-fit mounted to the frame such that the housing is positioned on the second side of the frame and the gear is positioned on the first side of the frame so as to be operably engaged with the main gear to dampen rotational movement of the main gear, the gear damper having an axis of rotation that is different and spaced away from the axis of rotation of the main gear, wherein the main gear is mounted to a post extending from the frame and wherein a first end of the spring is secured to the frame and a second end of the spring is mounted to the main gear, and wherein the main gear is mounted to the post by outwardly extending locking elements extending from the post.

11. A damper, comprising:

a frame having a first side and an opposite second side;

a main gear mounted to the first side of the frame for rotation, the gear having a circumferential recess formed thereon defining a circumferential channel, the gear having an axis of rotation;

a spring operably connecting the main gear and the frame such that rotation of the main gear tensions the spring;

an elongated flexible member wrapped around the main gear and disposed within the circumferential channel, the flexible member having a first end portion attached to the main gear and a second end portion attached to another member; and a gear damper having a gear and a housing to support the gear, the gear damper being mounted to the frame such that the housing is positioned on the second side of the frame and the gear is positioned on the first side of the frame so as to be operably engaged with the main gear to dampen rotational movement of the main gear, the gear damper having an axis of rotation that is different and spaced away from the axis of rotation of the main gear, wherein the flexible elongated member is a tether.

12. A damper, comprising:

a frame having a first side and an opposite second side;

a rotatable main gear mounted to the first side of the frame, the gear having teeth and having an axis of rotation;

a biasing element operably connected to the main gear such that rotation of the main gear biases the biasing element;

an elongated flexible member wrapped around the main gear coaxial with the main gear axis of rotation, wherein one end of the elongated flexible member is attached to the main gear and an opposite end is configured for attachment to a device that is adapted for movement, the movement of which is controlled by the damper; and a gear damper having a gear having teeth thereon, and a housing to support the gear, the gear damper being mounted to the frame such that the housing is positioned on the second side of the frame and the gear damper teeth are positioned on the first side of the frame so as to be operably engaged with the main gear teeth to dampen rotational movement of the main gear in at least one direction of rotation, the gear damper having an axis of rotation that is different and spaced away from the axis of rotation of the main gear, and the gear damper being enmeshed with the main gear regardless of the direction of rotation of the main gear and the gear damper, wherein the gear damper is engaged to dampen rotational movement of the main gear when the main gear rotates in a first direction, and wherein the gear damper is further engaged to dampen rotational movement of the main gear when the main gear rotates in a second direction opposite the first direction.

13. A damper, comprising:

a frame having a first side and an opposite second side;

a rotatable main gear mounted to the first side of the frame, the gear having teeth and having an axis of rotation;

a biasing element operably connected to the main gear such that rotation of the main gear biases the biasing element;

an elongated flexible member wrapped around the main gear coaxial with the main gear axis of rotation, wherein one end of the elongated flexible member is attached to the main gear and an opposite end is configured for attachment to a device that is adapted for movement, the movement of which is controlled by the damper; and a gear damper having a gear having teeth thereon, and a housing to support the gear, the gear damper being mounted to the frame such that the housing is positioned on the second side of the frame and the gear damper teeth are positioned on the first side of the frame so as to be operably engaged with the main gear teeth to dampen rotational movement of the main gear in at least one direction of rotation, the gear damper having an axis of rotation that is different and spaced away from the axis of rotation of the main gear, and the gear damper being enmeshed with the main gear regardless of the direction of rotation of the main gear and the gear damper, wherein the gear damper is engaged to dampen rotational movement of the main gear when the main gear rotates in a first direction, and wherein the gear damper is farther to dampen rotational movement of the main gear when the main gear rotates in a second direction opposite the first direction, wherein the gear damper axis of rotation is moveable relative to the main gear axis of rotation.

14. The damper in accordance with claim 12 wherein the gear damper axis of rotation is fixed relative to the main gear axis of rotation.

15. The damper in accordance with claim 12 wherein the main gear includes a reel formed therein adjacent the teeth of the main gear, and wherein the elongated flexible member wraps around the main gear within the reel.

* * * * *